United States Patent
Ravichandran et al.

(10) Patent No.: US 12,172,184 B2
(45) Date of Patent: Dec. 24, 2024

(54) METHOD FOR APPLYING A COATING TO AT LEAST ONE ELECTRONIC COMPONENT, SENSOR ARRANGEMENT COMPRISING A COATING AND COATING CARRIER

(71) Applicant: TDK Electronics AG, Munich (DE)

(72) Inventors: Subramanian Ravichandran, Deutschlandsberg (AT); Gerhard Hojas, Söding-St. Johann (AT)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 18/029,765

(22) PCT Filed: Aug. 2, 2022

(86) PCT No.: PCT/EP2022/071688
§ 371 (c)(1),
(2) Date: Mar. 31, 2023

(87) PCT Pub. No.: WO2023/036520
PCT Pub. Date: Mar. 16, 2023

(65) Prior Publication Data
US 2024/0001395 A1 Jan. 4, 2024

(30) Foreign Application Priority Data
Sep. 8, 2021 (DE) ...................... 10 2021 123 241.4

(51) Int. Cl.
*B05C 5/00* (2006.01)
*B05C 11/10* (2006.01)
*G01K 7/22* (2006.01)

(52) U.S. Cl.
CPC .............. *B05C 5/002* (2013.01); *B05C 11/10* (2013.01); *G01K 7/22* (2013.01)

(58) Field of Classification Search
CPC .. B05C 3/02; B05C 3/09; B05C 5/002; B05C 11/10; G01K 7/22; B05D 1/18
See application file for complete search history.

(56) References Cited

U.S. PATENT DOCUMENTS

| 4,013,040 A | 3/1977 | Horikoshi |
| 4,697,543 A * | 10/1987 | Abbott .................. C30B 19/063 |
| | | 118/421 |

(Continued)

FOREIGN PATENT DOCUMENTS

| DE | 112011101480 T5 | 5/2013 |
| DE | 102020126833 A1 | 4/2022 |

(Continued)

OTHER PUBLICATIONS

International Search Report and Written Opinion of International Searching Authority corresponding to International Patent Application No. PCT/EP2022/071688, with English translation of Search Report, mailed Nov. 25, 2022 (11 pages).

*Primary Examiner* — Michael P Wieczorek
(74) *Attorney, Agent, or Firm* — Nixon Peabody LLP

(57) ABSTRACT

A method for applying a coating to at least one electronic component. The method includes providing a coating carrier having a main base, a coating base having a recess, and a moveable reservoir having a further recess. The method further includes filling a coating material into the recess of the reservoir; sliding the reservoir along a longitudinal axis of the coating carrier such that the recess of the coating base is filled with coating material; providing an electronic component and dipping at least parts of the electronic component into the coating material provided in the recess of the coating base to form a coating of the electronic component. Furthermore, a sensor arrangement for measuring a temperature is described having a coating applied by the method. A (Continued)

Figure 1:
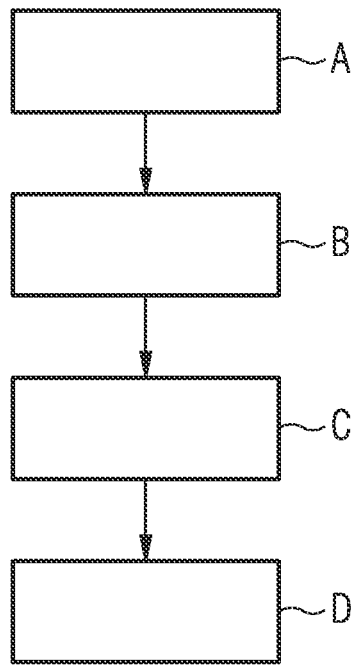

coating carrier for applying a coating to an electronic component is described.

8 Claims, 8 Drawing Sheets

(56) References Cited

U.S. PATENT DOCUMENTS

2013/0223479 A1  8/2013  Satou
2021/0215549 A1* 7/2021  Suzuki .................... B05D 7/20

FOREIGN PATENT DOCUMENTS

JP          S 541148 C3    1/1979
JP          2018-75540 C4  5/2018

* cited by examiner

METHOD FOR APPLYING A COATING TO AT LEAST ONE ELECTRONIC COMPONENT, SENSOR ARRANGEMENT COMPRISING A COATING AND COATING CARRIER

CROSS-REFERENCE TO RELATED APPLICATIONS

This application is a U.S. National Stage of International Application No. PCT/EP2022/071688, filed Aug. 2, 2022, which claims the benefit of German Patent Application No. 102021123241.4, filed Sep. 8, 2021, both of which are incorporated herein by reference in their entireties.

The present invention concerns a method for applying a coating to at least one, preferably to a plurality of, electronic components. In particular, the coating is applied to a plurality of sensors arrangements. The present invention further relates to a sensor arrangement, preferably a temperature sensor arrangement, comprising a coating. The present invention further relates to a coating carrier for applying a coating to at least one electronic component.

The increasing demand of electronic components, for example NTC (Negative Temperature Coefficient) temperature sensors, calls for cost-effective production by reducing material and energy consumption. But high reliability requires the use of synchronized combinations of new material and production technologies.

One essential requirement for high reliability is a coating protection layer (protection against mechanical, climatical, chemical, thermal, light, etc. influences) in defined geometrical dimensions (coating layer thickness, head diameter and coated length) typically using powder and resin based coating materials.

Currently, the state of the art technologies for coating of wire contacted electronic components are electrostatic, fluid bed, spray gun and dip coating technologies.

These technologies are resulting in high wastage of coating materials (ratio between the coating material required in the component and coating material lost). Furthermore, recycling of unused coating material is required resulting in accumulation of foreign materials. Increased demand for higher accuracy with miniaturized design requirement results in yield loss using the above mentioned technologies.

It is an object of the present disclosure to solve the above mentioned problems. This object is solved by the method and the sensor arrangement according to the independent claims.

According to a first aspect, a method for applying a coating is provided. In particular, a coating is applied at least to parts of at least one electronic component, preferably of a plurality of electronic components. The respective electronic component can be any kind of electronic device, for example a temperature sensor. However, is to be understood that the present disclosure is not limited to temperature sensors.

The method comprises the following steps:

In a first step A), a coating carrier is provided. The coating carrier comprises a main base. The main base comprises a flat, for example rectangular, base and is adapted and arranged to hold further components of the coating carrier.

The coating carrier further comprises a coating base. The coating base is arranged on the main base and comprises a recess. The recess is adapted and arranged for receiving and holding a coating material. The recess constitutes a coating material bed of the coating base.

The coating carrier further comprises a reservoir. The reservoir is at least partly mounted on the coating base. The reservoir extends perpendicularly to a main direction of extension of the coating base. The reservoir is moveable. In particular, it is moveable along a longitudinal axis of the coating carrier/the main base. The reservoir comprises a further recess. The recess of the reservoir is also adapted and arranged for receiving and holding coating material. The recess constitutes a coating material bed of the reservoir.

In a next step B), coating material is filled into the recess of the reservoir. This occurs in a spill-free manner. No coating material is wasted. The coating material comprises a powder or a resin.

In a next step C), the reservoir is slid along the longitudinal axis of the coating carrier such that the recess of the coating base is filled with coating material. This occurs in a spill-free manner. The reservoir is slid manually or automatically.

In a next step D), at least one electronic component, preferably a plurality of electronic components, is provided. The respective electronic component is arranged above the filled recess of the coating base. The respective electronic component is dipped at least partly into the coating material provided in the recess of the coating base to form a coating of (at least parts of) the electronic component. The forming of the coating layer by dipping into the coating material occurs in a spill- and splash-free manner.

The spill-free coating method allows to make a coating protection layer in defined geometrical dimensions involving no additional features of machine in the process. Product cost can be minimized by:

a) Reduction of powder materials up to 80% and for resin material up to 201,
b) Reduction of foreign material accumulation,
c) Less machine features (recycling, dosing, spraying, levelling, stirring features are not required inside the machine),
d) Reduction/elimination of coating splashes.

All in all a very effective and cost-efficient method for applying a coating layer is provided.

According to one embodiment, the recess of the reservoir comprises a cut-out. The cut-out is arranged in a bottom of the said recess. The cut-out constitutes an opening in the bottom of the recess of the reservoir. The cut-out extends perpendicularly to the longitudinal axis. The cut-out is adapted and arranged to transfer coating material into the recess of the coating base.

In step C), the reservoir is moved over the coating base, in particular over an upper surface of the coating base, until the cut-out is arranged directly above the recess of the coating base.

In step C), the reservoir is slid from an initial position to a final position. In the initial position, the cut-out in the recess of the reservoir is closed. In particular, the cut-out is closed by the upper surface of the coating base on which the reservoir is at least partly mounted. In the final position, the cut-out is no longer closed. In particular, in the final position, the cut-out is arranged directly above the recess of the coating base. Accordingly, coating material is transferred/falls from the recess of the reservoir via the cut-out into the recess of the coating base.

In this way, coating material can be transferred easily and in a spill-free manner from the reservoir into the recess of the coating base.

According to one embodiment, after having filled the recess of the coating base with coating material, the reservoir is slid back to the initial position. This occurs manually or automatically. During movement of the reservoir, the remaining coating material remains safely in the recess of the reservoir. Wastage of the coating material is prevented.

According to one embodiment, the coating carrier comprises at least two guiding elements. The guiding elements comprise rails (e.g. metal rails) attached to the upper surface of the main base. The guiding elements are arranged at least partly along the main base. The guiding elements extend parallel to each other along the longitudinal axis of the main base. In step D), the reservoir is slid along the guiding elements. In this way, the reservoir comprising the coating material is safely moved along the main base. Wastage/spill of the coating material can be effectively prevented.

According to one embodiment, a variation in a total length of the coating is smaller as compared to conventional coating technology. The total length of the coating is to be understood as the complete extension of the coating along a main longitudinal axis of the respective electronic component, i.e. the coated length of the electronic component.

From this it can be concluded that the use of coating materials, i.e. the amount of coating material, is reduced by means of the previously described method. Moreover, a very well defined geometrical dimension of the coating can be achieved by means of the spill-free coating method.

According to a further aspect of the present disclosure, a sensor arrangement is provided. The sensor arrangement may be adapted for measuring a temperature. The sensor arrangement may be wire contacted. The sensor arrangement can be a NTC temperature sensor arrangement, for example.

The sensor arrangement comprises a sensor element having a ceramic base body and at least two electrodes. The electrodes are arranged on an outer side of the ceramic base body.

The sensor arrangement further comprises at least two contacting elements for electrical contacting of the sensor element. The contacting elements are connected to the electrodes in a connection region.

The sensor arrangement further comprises a coating. A material of the coating comprises a powder or a resin. The coating is applied to the sensor arrangement, in particular to parts of the sensor arrangement, by means of the previously described method. All features described in connection with the method apply for the sensor arrangement and vice versa.

At least the ceramic base body and the connection region are completely covered by the coating. The coating constitutes a protection layer of the sensor arrangement. By means of the coating, at least parts of the sensor arrangement are effectively protected against environmental influences.

According to one embodiment, the sensor arrangement comprises a sensor head. The sensor head constitutes an upper region of the sensor arrangement. The sensor head comprises the sensor element with electrodes and the connection region as well as at least a partial area of the contacting elements. The coating forms an outer shell of a sensor head.

A variation in a length of the sensor head is lower as compared to conventional coating technologies. Moreover, a variation in the total length of the coating is lower as compared to conventional coating technologies.

Accordingly, a very compact sensor arrangement with well-defined dimensions is provided.

In particular, the present application comprises the following aspects:

1. Method for applying a coating to at least one electronic component comprising the following steps:
A) Providing a coating carrier having
a main base,
a coating base comprising a recess,
a moveable reservoir comprising a further recess;
B) Filling a coating material into the recess of the reservoir;
C) Sliding the reservoir along a longitudinal axis of the coating carrier such that the recess of the coating base is filled with coating material;
D) Providing at least one electronic component and dipping at least parts of the electronic component into the coating material provided in the recess of the coating base to form a coating of the electronic component.
2. Method according to aspect 1,
wherein the recess of the reservoir comprises a cut-out arranged in a bottom of the recess and, wherein, in step C), the reservoir is moved over the coating base until the cut-out is arranged above the recess of the coating base.
3. Method according to aspect 1 or aspect 2,
wherein the recess of the reservoir comprises a cut-out arranged in a bottom of the recess and, wherein, in step C), the reservoir is slid from an initial position, where the cut-out in the recess is closed, to a final position, where the cut-out in the recess is no longer closed, such that coating material is transferred from the recess of the reservoir via the cut-out into the recess of the coating base.
4. Method according to aspect 3,
wherein, after having filled the recess of the coating base with coating material, the reservoir is slid back to the initial position.
5. Method according to any one of the previous aspects,
wherein the coating carrier comprises at least two guiding elements arranged at least partly along the main base, wherein in step D), the reservoir is slid along the guiding elements.
6. Method according to any one of the previous aspects,
wherein no spilling of the coating material takes place when the reservoir is moved along the longitudinal axis and/or when the recesses are filled with coating material.
7. Method according to any one of the previous aspects,
wherein the coating material comprises a coating powder or a resin.
8. Method according to any one of the previous aspects,
wherein the at least one electronic component comprises a sensor arrangement for measuring a temperature.
9. Method according to any one of the previous aspects,
wherein a variation in a total length of the coating is smaller as compared to conventional coating technology.
10. Sensor arrangement for measuring a temperature comprising:
a sensor element having a ceramic base body and at least two electrodes, the electrodes being arranged on an outer side of the ceramic base body,
at least two contacting elements for electrical contacting of the sensor element, the contacting elements being connected to the electrodes in a connection region,
a coating, wherein at least the ceramic base body and the connection region are completely covered by the coating, wherein the coating is applied by a method according to any one of the previous claims.

11. The sensor arrangement according to aspect 10, comprising a sensor head, wherein the sensor head comprises the sensor element and at least a partial area of the contacting elements, wherein the coating forms an outer shell of a sensor head.

12. The sensor arrangement according to aspect 11, wherein a variation in a length of the sensor head and in a total length of the coating is lower as compared to conventional coating technologies.

13. The sensor arrangement according to any one of aspects 10 to 12, wherein a material of the coating comprises a powder or a resin.

14. Sensor arrangement according to any one of aspects 10 to 13, wherein the sensor arrangement (1) is a NTC temperature sensor arrangement.

Further features, refinements and expediencies become apparent from the following description of the exemplary embodiments in connection with the figures.

Figure 2:
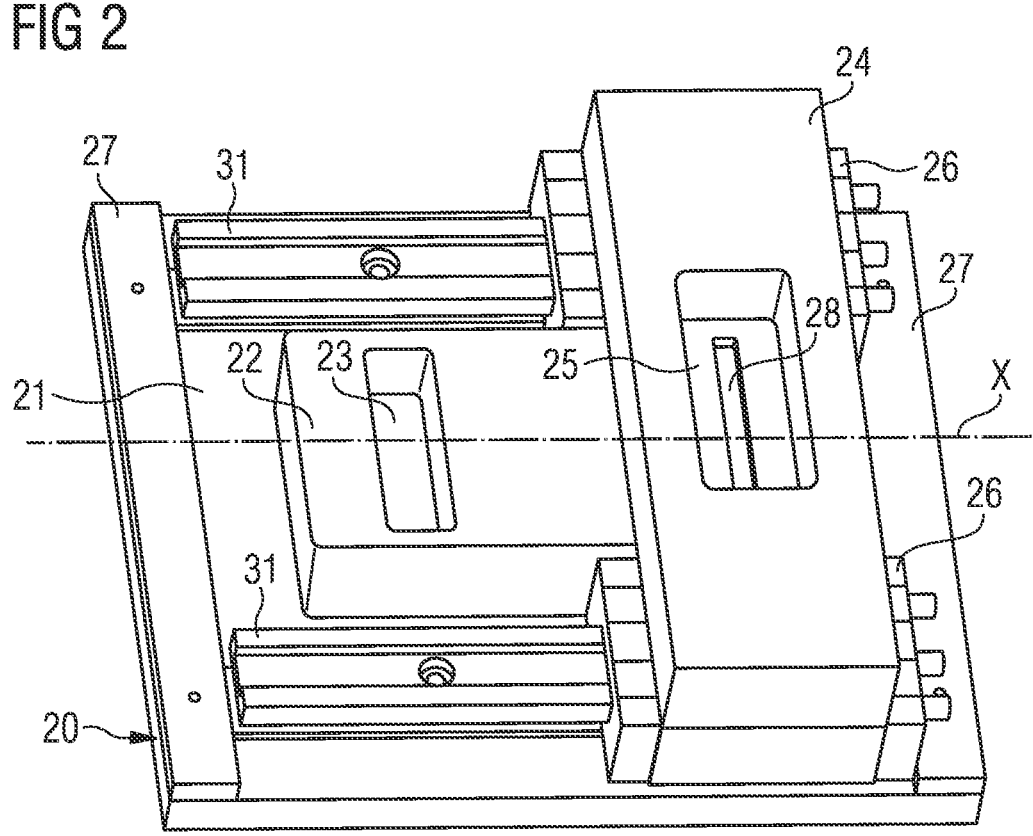
Figure 3A:
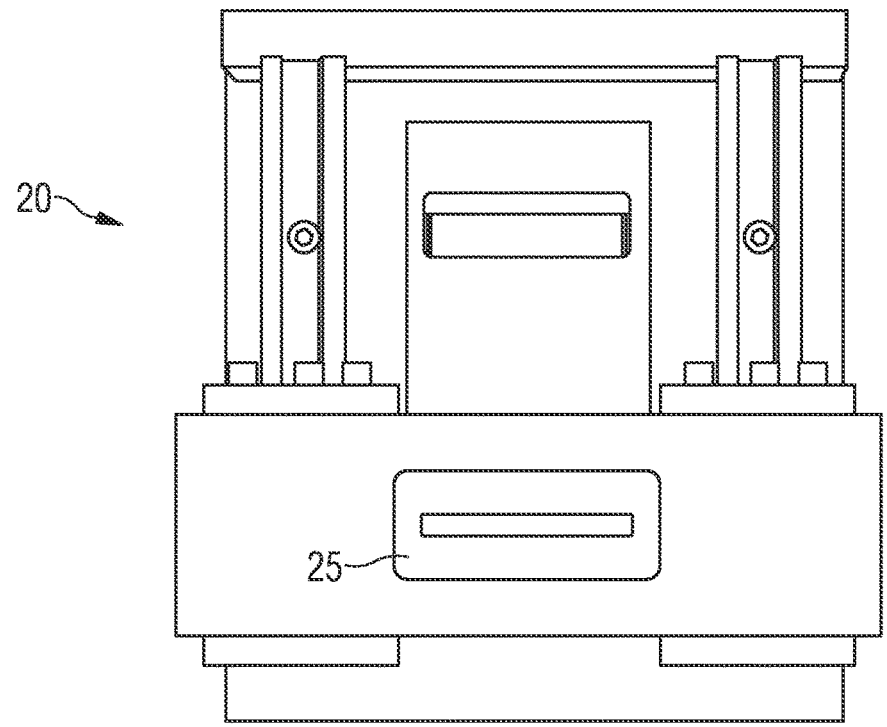
Figure 3B:
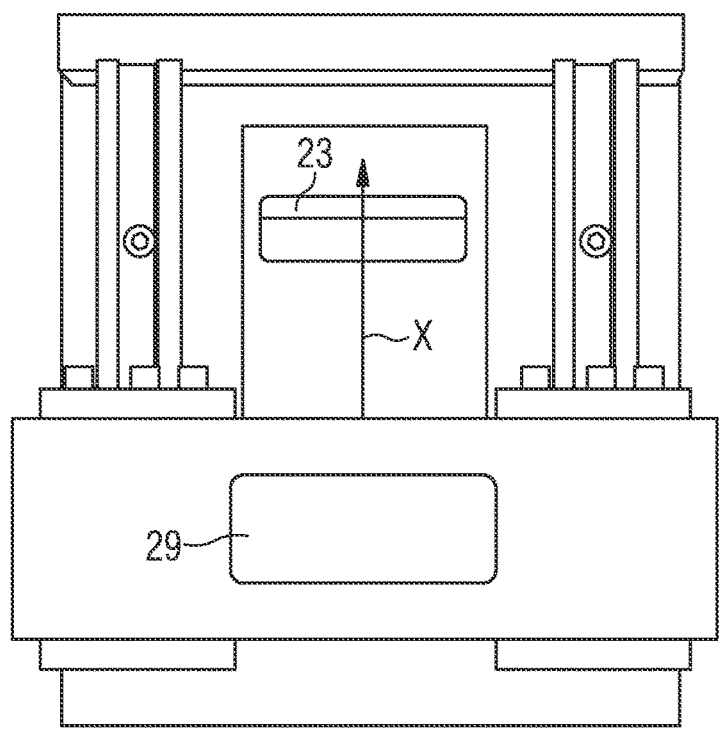
Figure 3C:
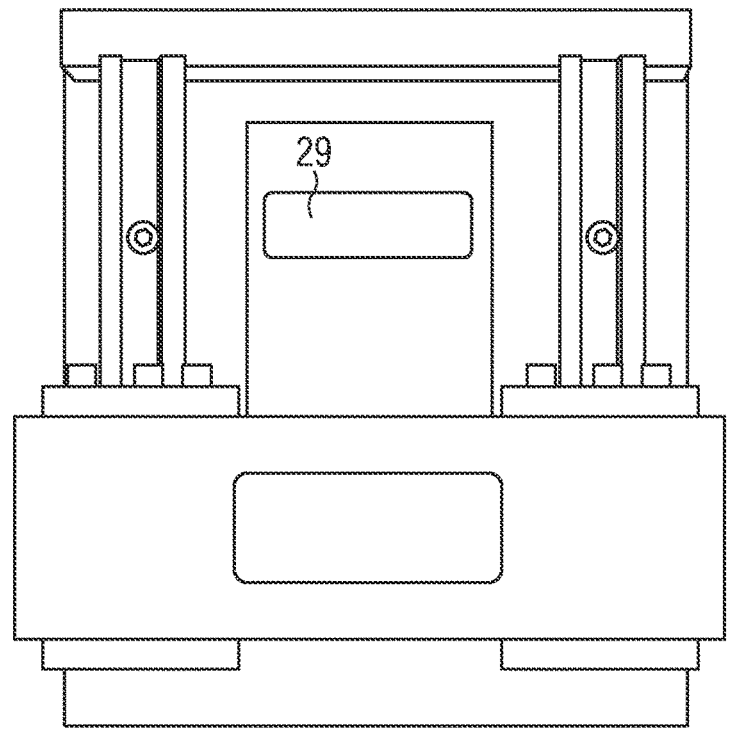
Figure 3D:
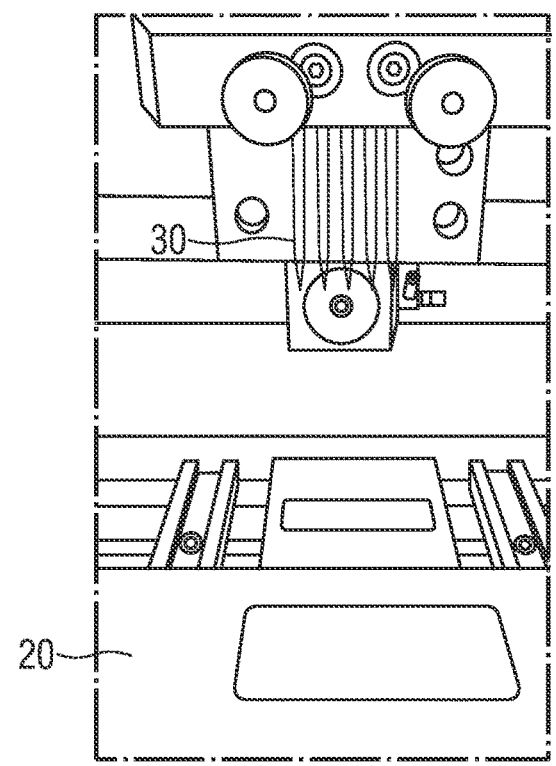
Figure 3E:
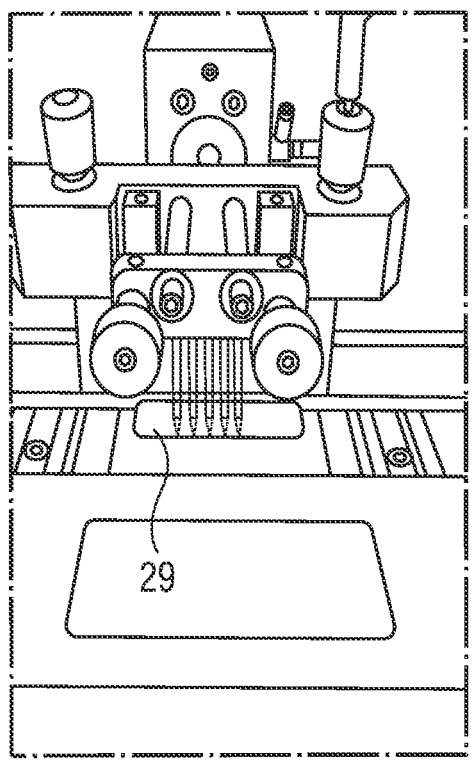
Figure 3F:
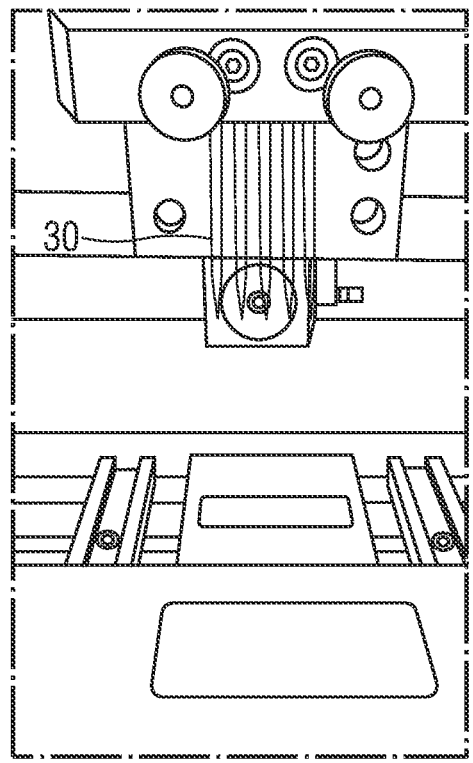
Figure 3G:
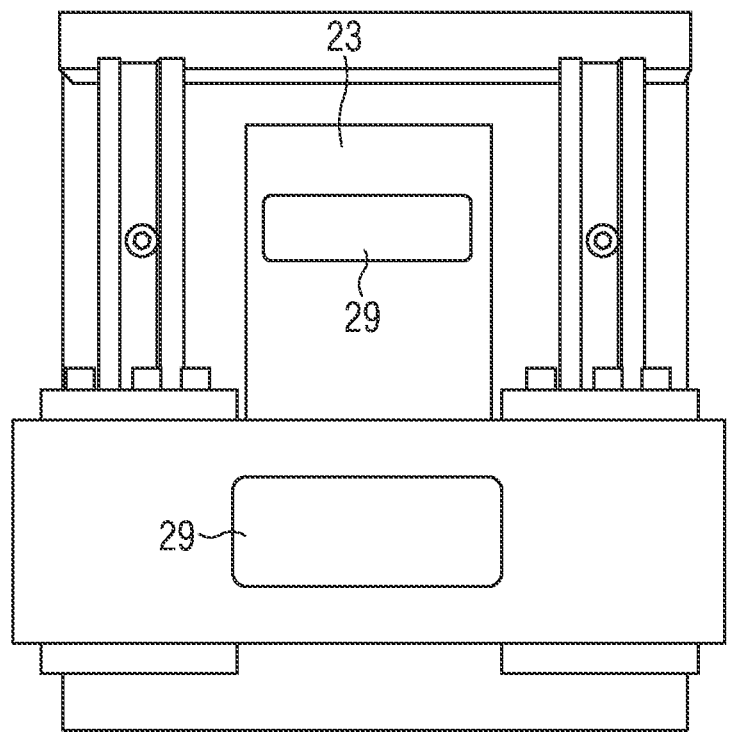
Figure 4:
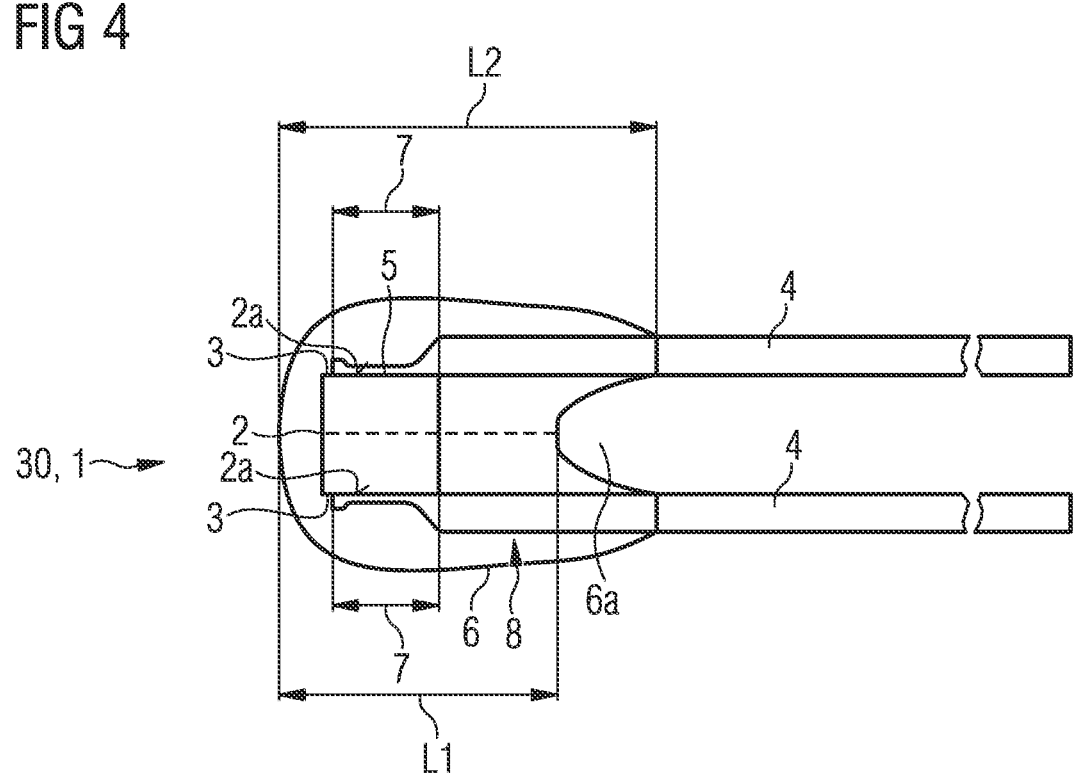
Figure 5:
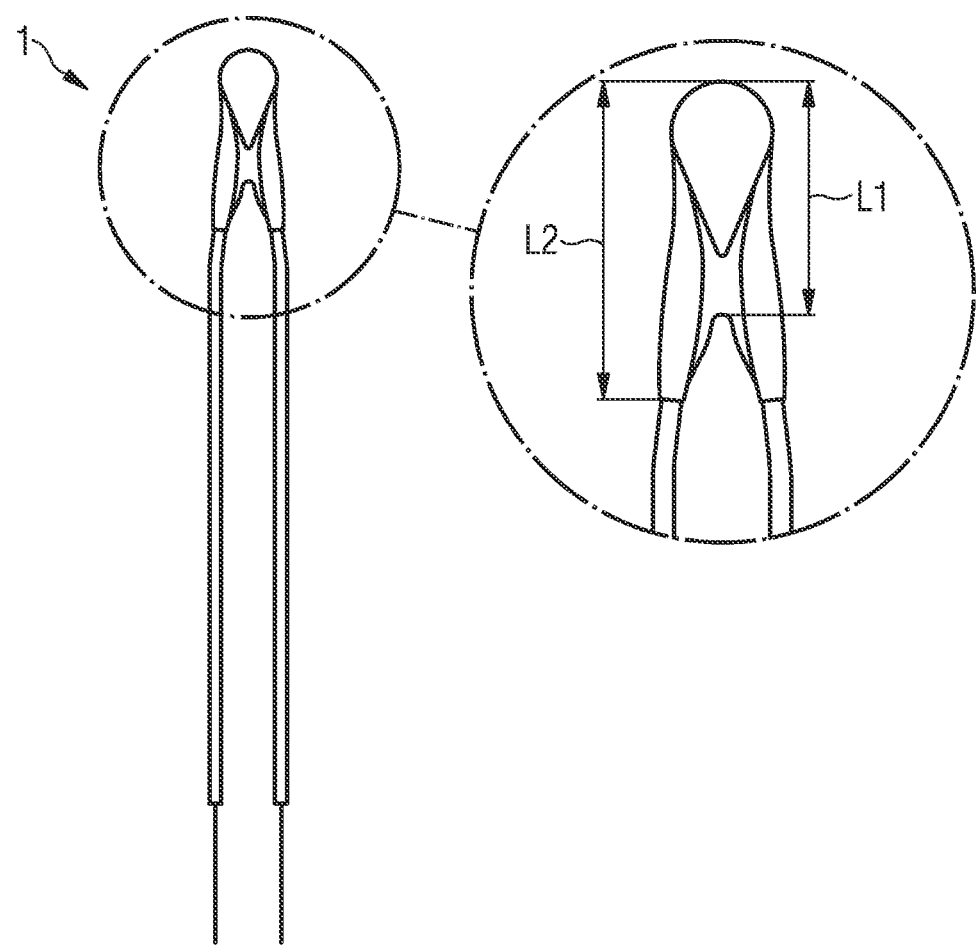
Figure 6A:
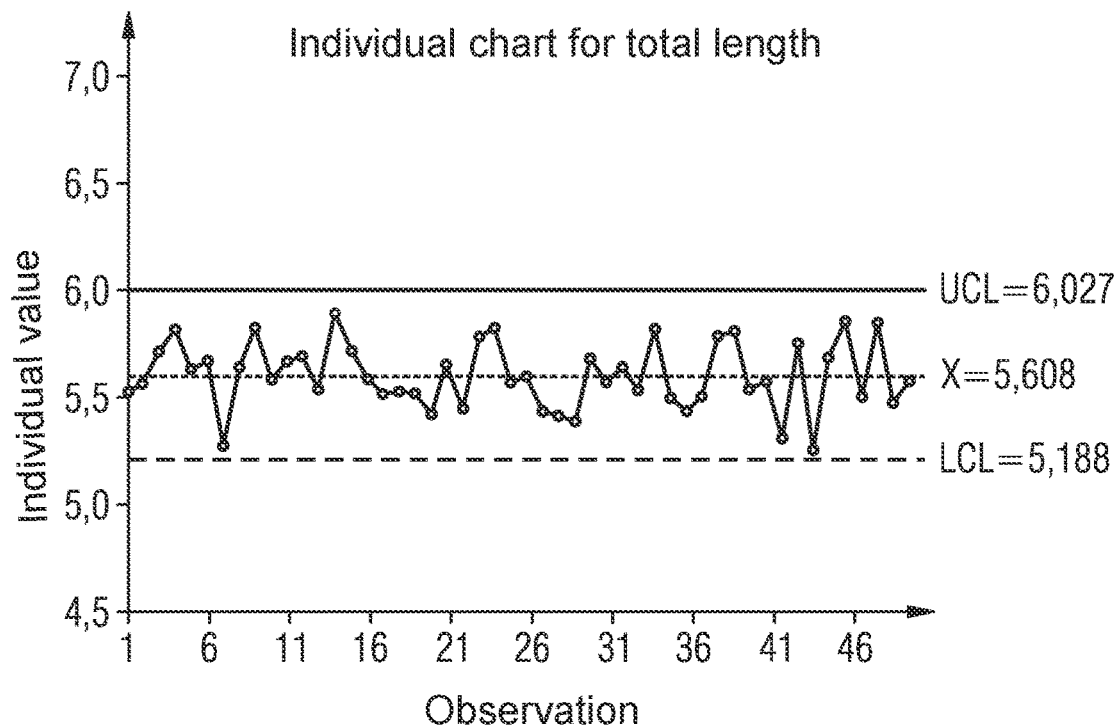
Figure 6B:
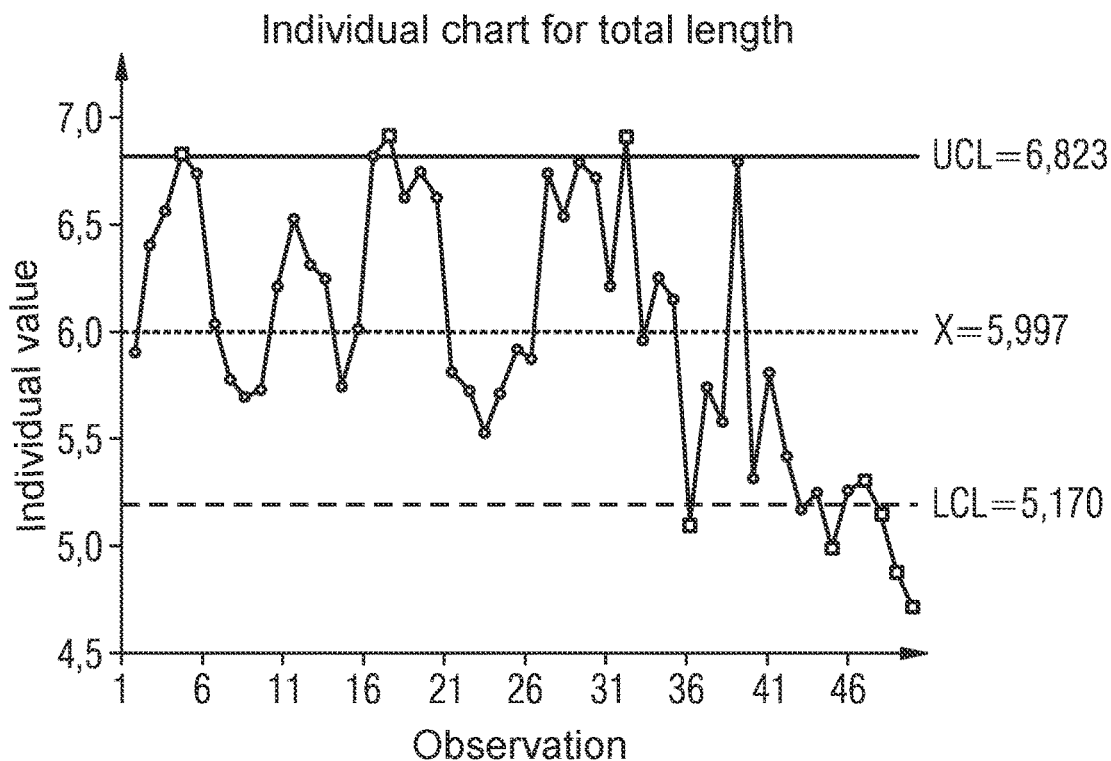
Figure 7A:
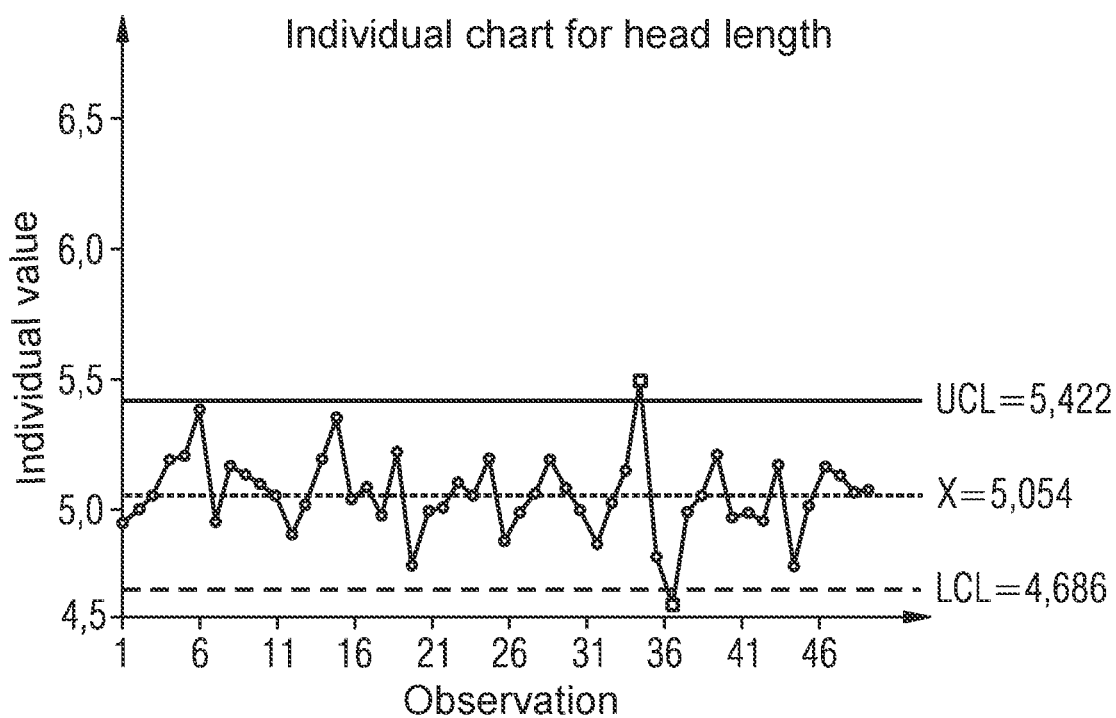
Figure 7B:
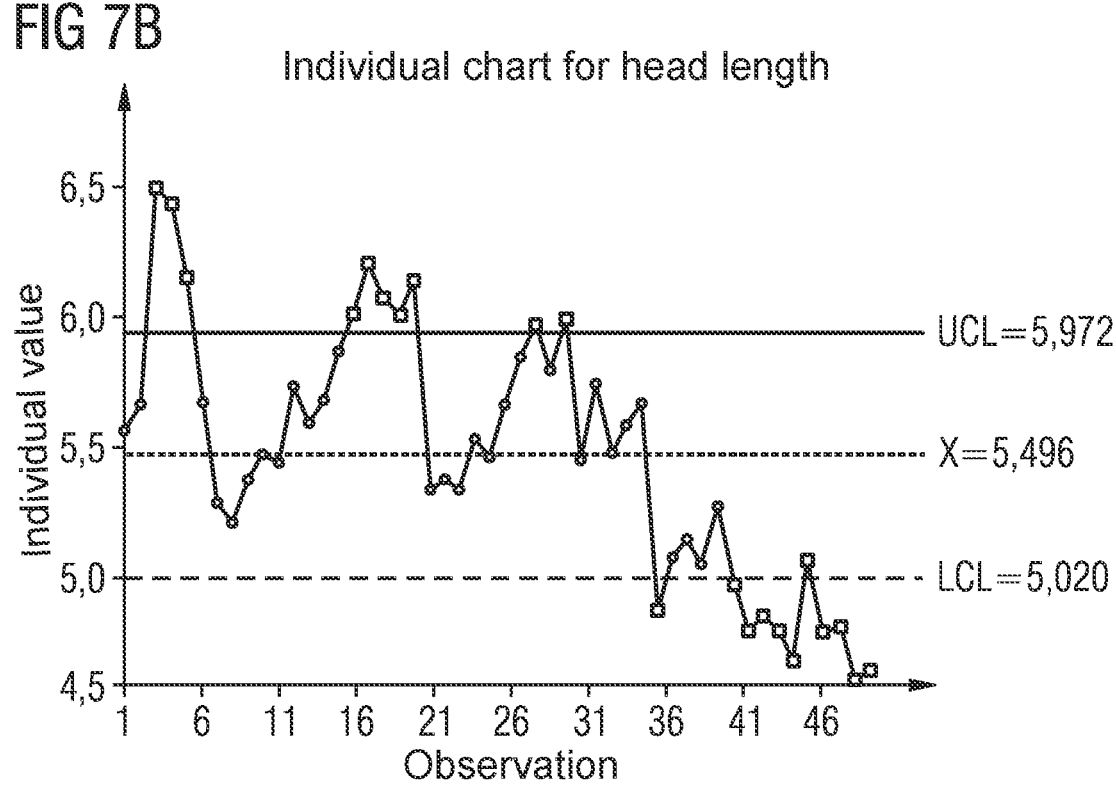

FIG. 1 shows a process diagram for a method for applying a coating to at least one electronic component, FIG. 2 shows a perspective view of a coating carrier, FIGS. 3A to 3G show different steps for the method for applying a coating to at least one electronic component, FIG. 4 schematically shows a sectional side view of a coated electronic component, FIG. 5 schematically shows a perspective view of the electronic component shown in FIG. 4, FIGS. 6A and 6B show diagrams illustrating a total length of a coating applied by the method according to the invention and of a coating applied by conventional technology, FIGS. 7A and 7B show diagrams illustrating a head length of a sensor arrangement comprising a coating applied by the method according to the invention and a coating applied by conventional technology.

In the figures, elements of the same structure and/or functionality may be referenced by the same reference numerals. It is to be understood that the embodiments shown in the figures are illustrative representations and are not necessarily drawn to scale.

FIG. 1 shows a process diagram for a method for applying a coating 6 to at least one, preferably to a plurality of, electronic components 30. The respective electronic component 30 may be a wire contacted electronic component. The respective electronic component 30 can be a sensor arrangement 1 for measuring a temperature, e.g. a NTC temperature arrangement (see also description in connection with FIGS. 4 and 5).

In a first step A) of the method, a coating carrier 20 is provided (see also FIGS. 2 and 3A). The coating carrier 20 comprises a main base 21. The main base 21 comprises a rectangular basic shape.

The coating carrier 20 further comprises a coating base 22. The coating base 22 has a rectangular shape and is provided in a centre region of an upper surface of the main base 21. In other words, the coating base 22 does not reach to the side edges of the main base 21. An extension of the coating base 22 along a longitudinal axis X of the main base 21 is greater that an extension of the coating base 22 along an axis perpendicular to the longitudinal axis X. In other words, a main expansion direction of the coating base 22 is along the (main) longitudinal axis X of the main base 21/coating carrier 20.

The coating base 22 may be glued or screwed to the main base 21, for example. The coating base 22 comprises a recess 23. The recess 23 is adapted and arranged to receive a coating material 29 in the further course of the described method. The recess 23 is arranged in a side region of an upper surface of the coating base 22 (FIG. 2: left region of upper surface) and extends perpendicularly to the longitudinal axis X. The recess 23 may be milled into the upper surface of the coating base 22, for example.

The coating carrier 20 further comprises a reservoir 24. The reservoir 24 has a rectangular shape and is—in an initial position—arranged in a side region (here right side region) of the upper surface of the main base 21. The reservoir 24 is at least partially supported on the upper surface of the coating base 22 (initial position: right side region of upper surface of the coating base 22). An extension of the reservoir 24 along the longitudinal axis X of the main base 21 is smaller than an extension of the reservoir 24 along the axis perpendicular to the longitudinal axis X. In other words, a main expansion direction of the reservoir 24 is perpendicular to the (main) longitudinal axis X/to the coating base 22.

The reservoir 24 comprises a recess 25. The recess 25 is adapted and arranged to receive coating material 29. The recess 25 is arranged in a centre region of an upper surface of the reservoir 24 and extends perpendicularly to the longitudinal axis X. The recess 24 may be milled into the upper surface of the reservoir, for example. The reservoir 24 is designed and arranged in such a way that the recess 25 is arranged directly above the upper surface of the coating base 22.

The recess 25 comprises a cut-out 28 arranged in a bottom surface of the recess 25. The cut-out 28 allows coating material 29 to be transferred from the recess 25 of the reservoir 24 into the recess 23 of the coating base 22, as will be described later. In the initial position, the upper surface of the coating base 22 forms a lower boundary of the cut-out 28, i.e. it closes the cut-out 28.

The reservoir 24 is moveable along the longitudinal axis X. For this purpose, the reservoir 24 is arranged on two sliders 26. The two sliders 26 are arranged oppositely to one another. In plan view of the coating carrier 20, one slider 26 is arranged above the coating base 22 and the other slider 26 is arranged below the coating base 22.

The coating carrier 20 further comprises two guiding elements 31. The respective slider 26 encloses a guiding element 31 and can be slid along the respective guiding element 31. The guiding elements 31 extend along the longitudinal axis X and are screwed to the main base 21.

The reservoir 24 is moveable manually or automatically. The reservoir 24 is moveable from the previously mentioned initial position (reservoir 24 is arranged in the right side region of main base 21; upper surface of the coating base 22 forms a lower boundary of the cut-out 28) to a final position (reservoir 24 is arranged in the left side region of the main base 21; the reservoir 23 (in particular a bottom of the reservoir 23) of the coating base 22 forms a lower boundary of the cut-out 28).

The coating carrier 20 further comprises two stoppers 27. The stoppers 27 are screwed to the main base 21. The stoppers 27 extend perpendicular to the longitudinal axis X. The stoppers 27 comprise thin rails or strips. The rails or strips can comprise metal, for example. The stoppers 27 limit the upper surface of the main base 21 on two opposite sides (FIG. 2: left side and right side of the main base 21). In particular, the stoppers 27 are adapted and arranged to limit movement of the reservoir 24 along the longitudinal axis X. The stoppers 27 ensure that the reservoir 24 can be moved only between the previously described initial position and final position.

After the coating carrier 20 is provided, it is first thoroughly cleaned (see FIG. 3A) to remove any impurities that might mix with the previously mentioned coating material 29.

In step B) of the method, coating material 29 is filled into the recess 25 of the reservoir 24 (see also FIG. 3B). The coating material 29 may comprise a powder or a resin. The coating material 29 may be filled up to an upper edge of the recess 25. Leakage of the coating material 29 from the cut-out 28 is prevented by the upper surface of the coating base 22 located beneath the cut-out 28.

In step C) of the method, the reservoir 24 is slid along the longitudinal axis X (i.e. along the guiding elements 31). The reservoir 24 is slid from the initial position to the final position, where the recess 25 of the reservoir 24 is arranged above the recess 23 of the coating base 22. During movement from the initial to the final position, leakage of the coating material 29 from the cut-out 28 is prevented by means of the upper surface of the coating base 22. Moreover, no spill takes place, e.g. over an edge of the recess 25, during movement of the reservoir 24.

In the final position, coating material 29 falls through the cut-out 28 into the recess 23 of the coating base 22, i.e. the recess 23 of the coating base 22 is filled with coating material 29 (see FIG. 3C). Thereby, spill of the coating material 29 is prevented. Afterwards, the reservoir 24 is moved back (automatically or manually) to its initial position.

In step D) of the method, at least one electronic component 30, preferably a plurality of electronic components 30, are provided (see FIG. 3D). The electronic components 30 are placed directly above the recess 23 of the coating base 22, i.e. directly above the coating material 29. The electronic components 30 are moved towards the recess 23 of the coating base 23 and are dipped at least partly into the coating material 29 (see FIG. 3E) provided in the recess 23 of the coating base 22 for forming a coating 6 of (at least parts of) the respective electronic component 30 in a splash- and spill-free manner. Afterwards, the electronic components 30 are moved back in their starting position above the recess 23 (FIG. 3F).

After having coated the electronic components 30, the recess 25 of the reservoir 24 (and, afterwards, the recess 23 of the coating base 22) is refilled with coating material 29 as described above (see FIG. 3G).

This occurs—due to the specific design of the coating carrier 20—in a spill-free manner.

In particular, the method described above is a spill-free coating technology. It allows to make a coating protection layer (coating 6) in defined geometrical dimension involving no additional features of machines in the process. Product cost can be minimized by:
  a) Reduction of powder materials up to 80% and for resin material up to 20%,
  b) Reduction of foreign material accumulation,
  c) Less machine features (recycling, dosing, spraying, levelling, stirring features are not required inside machine)
  d) Reduction of coating splashes.

FIGS. 4 and 5 show an example of a coated electronic component 30.

The respective electronic component 30 may comprise a wire contacted electronic component. The respective electronic component 30 may comprise a sensor arrangement 1, which is designed to measure a temperature, e.g. a NTC temperature sensor arrangement. The sensor arrangement 1 can be designed for use at high temperatures.

The sensor arrangement 1 has a sensor element or a sensor chip. The sensor element is preferably an NTC thermistor chip. The sensor element comprises a ceramic base body 2. The ceramic base body 2 has side surfaces 2a which are arranged opposite each other. The sensor element further has two electrodes 3. The electrodes 3 are formed on an outer surface of the sensor element. In particular, the electrodes 3 are formed on the opposing side surfaces 2a of the ceramic base body 2.

The sensor arrangement 1 further comprises two contacting elements 4 for electrical contacting of the sensor element. The contacting elements 4 preferably comprise wires. The contacting elements 4 are electrically and mechanically connected to the electrodes 3 in a connection region 7. The electrodes 3 and the contacting elements 4 may be connected to each other via a contacting paste 5, for example.

The sensor arrangement 1 further comprises a coating 6, i.e. the coating 6 achieved by the previously described method. The coating 6 completely encloses the ceramic base body 2 of the sensor element as well as the connection region 7. In particular, the coating 6 completely encloses a head 8 of the sensor arrangement 1 (sensor head 8). The sensor head 8 comprises the sensor element as well as at least a partial area of the contacting elements 4, as can be seen in FIGS. 4 and 5. The coating 6 forms an outer shell of the sensor head 8 and protects the sensor head 8 from environmental influences.

An indentation 6a of the coating 6 occurs on an underside of the coating 6. This results from the previously mentioned dipping of the electronic component 30/the sensor arrangement 1 in the coating material 29. The sensor head 8 extends from an upper end of the sensor arrangement 1 to a vertex of the indentation 6a (i.e. total length L1 of the sensor head 8).

The total length L1 of the sensor head 8, i.e. the complete extension of the sensor head 8 along the main longitudinal axis of the electronic component 30/sensor arrangement 1 (see FIG. 7A) is smaller as compared to conventional coating technology (see FIG. 7B).

More specifically, a variation in the total head length L1 is smaller as compared to conventional coating technology (see FIG. 7A). In other words, the variation in the total head length achieved by conventional coating methods is statistically significantly higher compared to the method according to the invention (see FIG. 7B).

In addition to that, a total length L2 of the coating 6, i.e. a complete extension of the coating 6 along a main longitudinal axis of the electronic component 30/sensor arrangement 1 (see FIG. 6A) is smaller as compared to conventional coating technology (see FIG. 6B).

A variation in the total length L2 of the coating 6 is smaller as compared to conventional coating technology (see FIG. 6A). In other words, the variation in total length of a coating achieved by conventional coating methods is statistically significantly higher compared to the method according to the invention (FIG. 6B).

All in all, by means of the previously described spill-free coating method, a variation in the sensor head length and a total length variation is statistically significantly lower compared to conventional coating technology. Moreover, coating splashes can be prevented. Compact and cost effective electronic components with well-defined geometrical dimensions are thus provided by means of the spill-free coating method.

REFERENCE NUMERALS

1 Sensor arrangement
2 Base body
2a Side surface of base body
3 Electrode
4 Contacting element
5 Contacting paste
6 Coating
6a Indentation
7 Connection region
8 Sensor head
20 Coating carrier
21 Main base
22 Coating base
23 Recess of coating base
24 Reservoir
25 Recess of reservoir
26 Slider
27 Stopper
28 Cut-out
29 Coating material
30 Electronic component
31 Guiding element
L1 Total length of sensor head
L2 Total length of coating
X Longitudinal axis

The invention claimed is:

1. A method of applying a coating to at least one electronic component, comprising:
  A) Providing a coating carrier having
    a main base,
    a coating base arranged on the main base and comprising a coating-base recess,
    a moveable reservoir comprising a reservoir recess;
  B) Filling a coating material into the reservoir recess;
  C) Sliding the reservoir along a longitudinal axis of the coating carrier such that the coating-base recess is filled with coating material;
  D) Providing at least one electronic component and dipping at least parts of the electronic component into the coating material provided in the coating-base recess to form a coating of the electronic component.

2. The method of claim 1, wherein the reservoir recess comprises a cut-out arranged in a bottom of the reservoir recess and, wherein, in step C), the reservoir is moved over the coating base until the cut-out is arranged above the coating-base recess.

3. The method of claim 1, wherein the reservoir recess comprises a cut-out arranged in a bottom of the reservoir recess and, wherein, in step C), the reservoir is slid from an initial position, where the cut-out in the reservoir recess is closed, to a final position, where the cut-out in the reservoir recess is no longer closed, such that coating material is transferred from the reservoir recess via the cut-out into the coating-base recess.

4. The method of claim 3, wherein, after having filled the coating-base recess with coating material, the reservoir is slid back to the initial position.

5. The method of claim 1, wherein the coating carrier comprises at least two guiding elements arranged at least partly along the main base, wherein in step D), the reservoir is slid along the at least two guiding elements.

6. The method of claim 1, wherein no spilling of the coating material takes place when the reservoir is moved along the longitudinal axis and/or when the reservoir recess and coating-base recess are filled with coating material.

7. The method of claim 1, wherein the coating material comprises a coating powder or a resin.

8. The method of claim 1, wherein the at least one electronic component comprises a sensor arrangement for measuring a temperature.

* * * * *